(12) United States Patent
Bosch et al.

(10) Patent No.: US 7,317,169 B2
(45) Date of Patent: Jan. 8, 2008

(54) SWITCHING DEVICE WITH A SWITCHING LEVER IN PARTICULAR FOR A VEHICLE

(75) Inventors: Juergen Bosch, Wallerstein (DE); Michael Gross, Nordheim (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/375,344

(22) Filed: Mar. 15, 2006

(65) Prior Publication Data

US 2006/0216101 A1    Sep. 28, 2006

(30) Foreign Application Priority Data

Mar. 22, 2005    (DE) .................... 10 2005 014 111

(51) Int. Cl.
*H01H 9/00*    (2006.01)
*H01H 27/06*    (2006.01)

(52) U.S. Cl. .................. 200/61.54; 200/61.27
(58) Field of Classification Search ........... 200/61.54
See application file for complete search history.

(56) References Cited

U.S. PATENT DOCUMENTS 5,406,253 A  *  4/1995  Doke et al. ............ 340/475
6,144,297 A     11/2000 Donner
6,904,823 B2 *  6/2005  Levin et al. ............ 74/471 XY
6,953,901 B2 * 10/2005  Onodera ................. 200/6 A
7,112,107 B1 *  9/2006  Torgerud ................ 440/2
2003/0188594 A1 10/2003 Levin
2003/0197601 A1 10/2003 Takagi

FOREIGN PATENT DOCUMENTS

EP    0 856 432    8/1998
GB    2 353 852    3/2001

* cited by examiner

Primary Examiner—Elvin Enad
Assistant Examiner—Lheiren Mae A. Anglo
(74) Attorney, Agent, or Firm—Paul Vincent

(57) ABSTRACT

A switching device in particular for a vehicle has a switching lever which can be deflected into different switching positions to activate switching processes. An actuator is driven by a control device to cause the switching lever to vibrate, the control device receiving input signals from at least one other control device and determines therefrom a set conditions for admissible deflection of the switching lever. The actuator is driven by the control device when the switching lever is deflected from a respective switching position into a switching position which does not meet the set conditions.

7 Claims, 2 Drawing Sheets

SWITCHING DEVICE WITH A SWITCHING LEVER IN PARTICULAR FOR A VEHICLE

This application claims Paris Convention priority of DE 10 2005 014 111.0 filed Mar. 22, 2005 the complete disclosure of which is hereby incorporated by reference.

BACKGROUND OF THE INVENTION

The invention concerns a switching device with a switching lever, in particular, for a vehicle, wherein the switching lever can be deflected for activating switching processes in different switching positions. The invention also concerns a method for operating a switching device of this type.

There are a plurality of conventional switching devices of this type. Such switching devices may e.g. be steering column switches comprising a switching lever for initiating signalling processes for changing the travelling direction. There are also conventional switching devices comprising a gear selection lever for shifting different gears of a vehicle transmission.

It is the underlying purpose of the present invention to propose a switching device of the above-mentioned type, which reduces the probability of activating undesired switching processes or switching processes that could have a negative effect.

SUMMARY OF THE INVENTION

This object is achieved with a switching device of the above-mentioned type by providing an actuator which can be controlled by a control device and which causes the switching lever to vibrate, wherein the control device receives input signals from at least one other control device and determines therefrom the set conditions for admissible deflection of the switching lever, wherein the actuator is controlled by the control device when the switching lever is deflected from its respective switching position into a switching position which does not meet the set conditions.

This reduces the danger of erroneous switching, since the user is informed if a switching process is being initiated that could have undesired consequences. The set conditions may vary depending on the type of switching process to be activated. The other control device is thereby advantageously associated with the switching process to be activated and provides the control device with input signals permitting the control device to determine whether a switching position of the switching lever meets the set conditions and is therefore admissible. If the set conditions are not met, the actuator is activated or the switching lever vibrates.

The switching device may advantageously be a steering column switch, wherein the switching lever initiates signalling processes for changing the direction of travel. This is advantageous in that, when the switching lever is deflected to indicate a change of travelling direction, the driver can be warned if the set conditions for the switching lever in the deflected position are not met.

Advantageously, the other control device is thereby associated with a blind spot detecting system, wherein the actuator is driven when a change of travelling direction is signalled, although an object has been detected in the blind spot region. The set conditions are consequently not met when the switching lever is used to initiate a signalling process for a change in travelling direction in which an object is located in the blind spot region.

In accordance with the invention, the other control device may be part of a navigation system and the actuator is driven upon initiation of a travelling direction change, although turning at this location is not admissible or the route calculated by the navigation system is not adhered to if the vehicle turns. Inadmissible turning may e.g. be indicated if the navigation system detects initiation of turning into a one-way street in the wrong direction.

The inventive switching device may also be a gear selection lever of a transmission, wherein the switching lever can be used to shift-in different transmission gears. If the user tries to shift in a gear that is inadmissible, i.e. that could damage the transmission and/or engine, a corresponding warning may be issued by driving the actuator.

The actuator and/or the control device are preferably disposed within the switching lever. The switching lever can thereby advantageously be handled together with the actuator and the control device as one unit. However, the invention may also provide that only the actuator is disposed in the switching lever and the associated control device is housed in a switch housing or switch module of the switching means.

The above-mentioned object is also achieved by a method according to the method for operating an inventive switching device.

Further features and details of the invention can be extracted from the following description which describes and explains the invention in more detail with reference to the embodiment shown in the FIGURE.

DESCRIPTION OF THE PREFERRED EMBODIMENT

Figure 1:
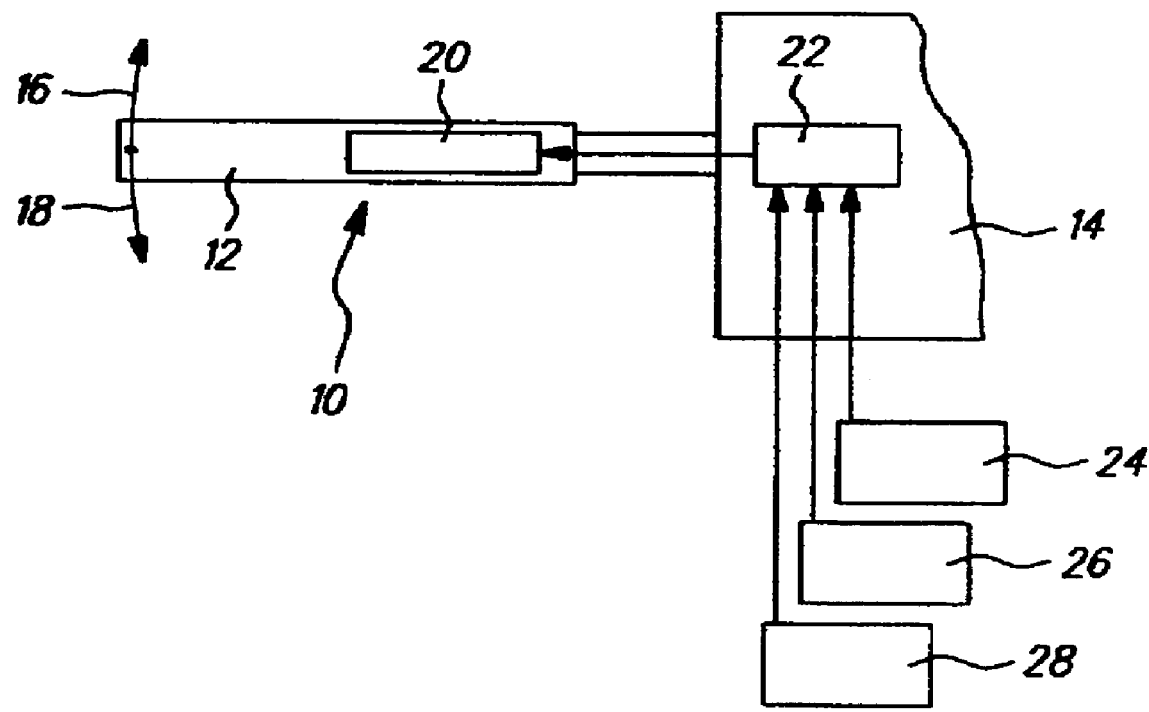
FIG. 1 shows a first embodiment of the inventive switching device.

The switching device comprises a switching lever 12 which is disposed on a housing 14 in such a manner that it can be deflected. The switching device 10 may be a steering column switch having a switching lever 12 which can be deflected in the direction of arrows 16, 18 to initiate processes for signalling a travelling direction change.

The switching lever 12 contains an actuator 20 which can be driven via a control device 22 and cause the switching lever 12 to vibrate. The control device 22 is connected to other control devices 24, 26, 28 in such a manner that the control device 22 receives input signals from these control devices. Based on the input signals, the control device 22 can determine set conditions for admissible deflection of the switching lever 12.

If the switching lever 12 is deflected by a user into a switching position which does not meet the set conditions, the actuator 20 is driven by the control device 22 and the switching lever 12 vibrates, in order to inform the user that the switching lever was moved into a switching position which is inadmissible, undesired or involves undesired consequences.

The control device 24 may be a control device of a blind spot detection system which informs the control device 22 whether there is an object in a blind spot region. If there is an object in a blind spot region and a change of travelling direction towards the object is indicated by the switching lever 12, the actuator is driven to inform the user that the change of travelling direction may be dangerous.

The control device 26 may e.g. be part of a navigation system. The control device 22 drives e.g. the actuator 20 when a change of travelling direction is indicated through deflection of the switching lever 12 although turning at this location is not admissible or if turning causes departure from the route calculated by the navigation system. The driver is informed through vibration of the switching lever 12 that turning involves danger or that he/she will depart from the calculated route.

The control device 28 may be part of a further vehicle system whose output signals serve as input signal of the control device 22.

Figure 2:
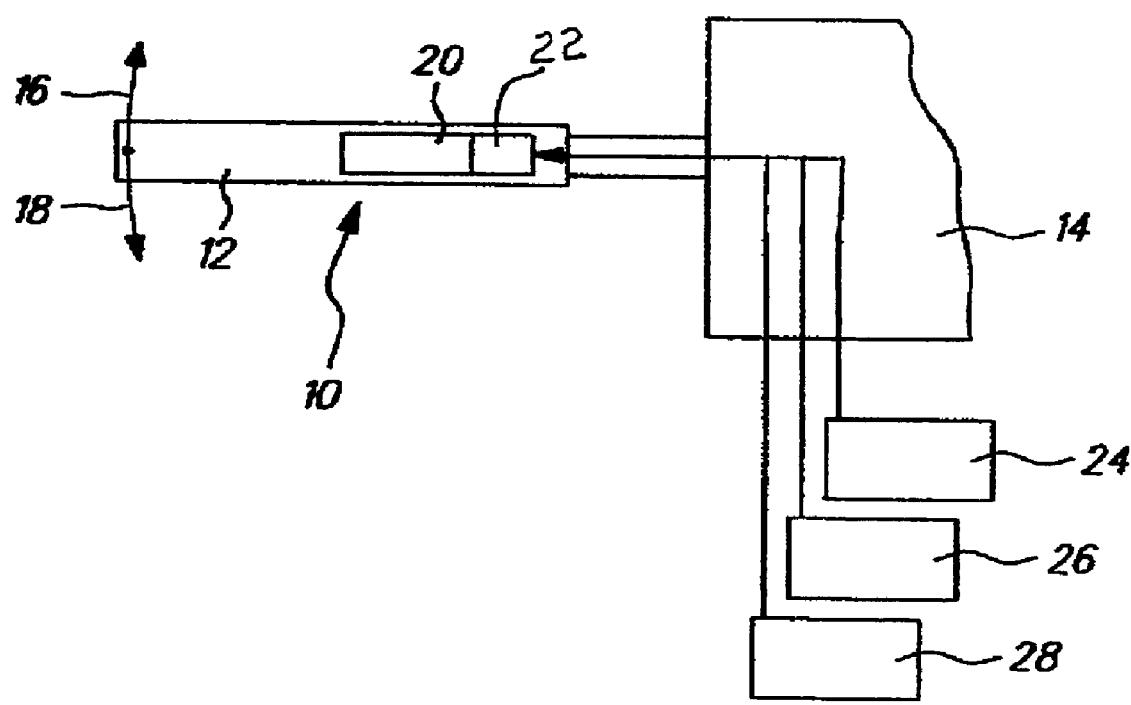
FIG. 2 shows a second embodiment of the inventive switching device.

In the embodiment of FIG. 2, the control device 22 is disposed in the switching lever 12.

We claim:

1. A switching device for a vehicle, the device comprising:
   a switching lever structured for deflection into different switching positions for activating a switching process;
   an actuator cooperating with said switching lever to cause vibration thereof;
   a first control device for generating first control signals;
   a second control device communicating with said first control device to receive said first control signals and to determine, using said first control signals, set conditions for admissible deflection of said switching lever, said second control device communicating with said actuator, wherein said actuator is driven by said second control device when said switching lever is deflected into a switching position which does not satisfy said set conditions, wherein the switching device is a steering column switch and said switching lever initiates signalling processes for changing a travelling direction, wherein said first control device is structured for blind spot detection and said actuator is driven upon initiation of a travelling direction change, although an object has been detected in a blind spot region.

2. The switching device of claim 1, wherein said actuator is disposed within said switching lever.

3. A switching device for a vehicle, the device comprising:
   a switching lever structured for deflection into different switching positions for activating a switching process;
   an actuator cooperating with said switching lever to cause vibration thereof;
   a first control device for generating first control signals;
   a second control device communicating with said first control device to receive said first control signals and to determine, using said first control signals, set conditions for admissible deflection of said switching lever, said second control device communicating with said actuator, wherein said actuator is driven by said second control device when said switching lever is deflected into a switching position which does not satisfy said set conditions, wherein the switching device is a steering column switch and said switching lever initiates signalling processes for changing a travelling direction, wherein said first control device is structured for navigation and said actuator is driven when a change in travelling direction is initiated, although turning is not admissible or causes departure from a route calculated by a navigation system.

4. The switching device of claim 3, wherein said actuator is disposed within said switching lever.

5. A switching device for a vehicle, the device comprising:
   a switching lever structured for deflection into different switching positions for activating a switching process;
   an actuator cooperating with said switching lever to cause vibration thereof;
   a first control device for generating first control signals;
   a second control device communicate with said first control device to receive said first control signals and to determine, using said first control signals, set conditions for admissible deflection of said switching lever, said second control device communicating with said actuator, wherein said actuator is driven by said second control device when said switching lever is deflected into a switching position which does not satisfy said set conditions, wherein said second control device is disposed within said switching lever.

6. The switching device of claim 5, wherein the switching device is a gear selection lever, wherein said switching lever shifts-in different gears of a transmission.

7. The switching device of claim 6, wherein the first control device communicates with said transmission and said actuator is driven upon initiation of shifting into a gear which is inappropriate.

* * * * *